(12) United States Patent
Moore, Jr.

(10) Patent No.: US 6,346,240 B1
(45) Date of Patent: **\*Feb. 12, 2002**

(54) METHODS OF TREATING ANIMAL WASTE SLURRIES

(75) Inventor: Philip A. Moore, Jr., Fayetteville, AR (US)

(73) Assignees: The United States of America as represented by the Secretary of Agriculture, Washington, DC (US); The Board of Trustees of the University of Arkansas, Little Rock, AR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,095

(22) Filed: Oct. 22, 1998

(51) Int. Cl.$^7$ ................................................. A61L 11/00
(52) U.S. Cl. .................. 424/76.6; 424/76.21; 424/76.5; 424/76.8; 424/405; 424/421; 424/682; 424/698; 424/685; 424/718; 119/432; 119/447; 119/450
(58) Field of Search .................................. 424/405, 421, 424/76.21, 76.5, 76.6, 76.8, 682, 685, 698, 718; 119/428, 432, 436, 437, 444, 447, 450, 527

(56) References Cited

U.S. PATENT DOCUMENTS

| | | | |
|---|---|---|---|
| 3,029,783 A | 4/1962 | Sawyer et al. | |
| 4,028,238 A | 6/1977 | Allan | |
| 4,034,078 A | 7/1977 | Van Horn | |
| 4,209,335 A | 6/1980 | Katayama et al. | |
| 4,306,516 A | 12/1981 | Currey | |
| 5,039,481 A | 8/1991 | Pacifici et al. | |
| 5,176,879 A | 1/1993 | White et al. | |
| 5,362,842 A | 11/1994 | Graves et al. | |
| 5,589,164 A | 12/1996 | Cox et al. | |
| 5,609,123 A | 3/1997 | Luke et al. | |
| 5,622,697 A | 4/1997 | Moore | |
| 5,634,431 A | 6/1997 | Reddy et al. | |

FOREIGN PATENT DOCUMENTS

| | | |
|---|---|---|
| EP | 0 156 924 B1 | 10/1985 |
| EP | 0 557 078 A1 | 8/1993 |
| WO | 84/02334 | 6/1984 |

OTHER PUBLICATIONS

Dedock FR 2414485 Abstract, Aug. 1979.*
Lopez WO 9922581 Abstract, Apr. 1998.*
Malloy et al Laboratory Study of Ammonia—Abstract I. J. Agric. Per. 22(1)37–45, 1983.*

* cited by examiner

*Primary Examiner*—Neil S. Levy
(74) *Attorney, Agent, or Firm*—Needle & Rosenberg, P.C.

(57) ABSTRACT

A method of treating liquid animal manure comprising contacting a manure slurry with a treatment composition comprising a treatment effective amount of $AlCl_3 \cdot nH_2O$ or $Al(NO_3)_3 \cdot mH_2O$, or the residue of $AlCl_3 \cdot nH_2O$ or $Al(NO_3)_3 \cdot mH_2O$, to form a resulting slurry, wherein n is from 0 to 10, and m is from 0 to 12. The treatment effective amount is effective to reduce phosphorus solubility in the manure; reduce phosphorus runoff and/or phosphorus leaching from fields fertilized with manure; inhibit ammonia volatilization from the manure; flocculate solids in the manure; reduce pathogens in the manure; increase the nitrogen content in the manure; and/or reduce acid rain and PM-10s associated with the manure.

22 Claims, 3 Drawing Sheets

METHODS OF TREATING ANIMAL WASTE SLURRIES

FIELD OF THE INVENTION

This invention relates generally to the treatment of animal wastes to reduce harmful phosphorus runoff from fields to which the animal wastes are applied, and to the reduction of ammonia emitted from such animal wastes. The invention is particularly applicable to treating liquid slurries of animal waste that are generated during the rearing of livestock in controlled rearing facilities.

BACKGROUND OF THE INVENTION

Swine and other livestock are commonly reared in facilities that are specially designed to manage manure and liquid waste generated by such livestock. For example, In some swine rearing facilities, swine are raised in enclosed facilities that have slatted floors. Beneath the floors are pits for receiving swine manure and urine that pass through the slatted floor. These pits contain water that is occasionally drained to remove the livestock waste. Other facilities raise swine on a hard slanted floor, and periodically wash accumulated manure and urine from the slanted floor. Still other facilities use a combined approach, and have slatted floors on which the swine are raised, and a slanted floor underneath that is periodically washed to remove accumulated manure and urine. Water that is used to flush manure in these facilities is often pumped into large tanks that can be quickly discharged to rapidly flush manure from the facility.

Dairy cows are also often raised in facilities that must periodically be washed of animal manure and urine. The dairy cows are often fed in a sheltered pen that has a hard concrete floor that is periodically washed.

Farmers manage the waste water from livestock rearing facilities in several manners. Almost all farmers attempt to apply the waste water onto agricultural fields. Some farmers spread the waste water from the facilities directly onto their fields. Other farmers first send the waste water to a holding pond or lagoon before spreading the waste water onto their fields. Because solids tend to separate from the water in the center of the holding pond or lagoon, some farmers withdraw water from the center of the pond or lagoon and reuse it in their facilities.

Manure excreted by the livestock generate ammonia that contributes to the offensive odor in many livestock rearing facilities. Ammonia volatilization is especially acute in facilities that are flushed with recycled water from an anaerobic lagoon or holding pond. Nitrogen in swine lagoon effluent is mostly in the form of $NH_4$, with little $NO_3$ present. Indeed, ammonia concentrations of 350 mg/l and greater are common in lagoon effluent. In addition, because swine lagoon effluent is typically alkaline (pH>7.0), ammonia is favored over ammonium, resulting in conditions favorable for ammonia volatilization. When high pH water from swine lagoons is used for flush water, large quantities of ammonia are volatilized, causing even further elevated levels of ammonia gas inside and outside the rearing facility.

High atmospheric ammonia levels in swine rearing facilities have been shown to have a significant negative effect on feed consumption, feed conversion and daily weight gain in pigs. High levels of atmospheric ammonia in swine rearing facilities also increase the susceptibility of swine to microorganisms responsible for respiratory problems, such as *P. multocida*. Ammonia also increases the susceptibility of four week old pigs to conchal atrophy. Likewise, high ammonia levels in swine facilities may play a significant role in the development of atrophic rhinitis.

Another detrimental aspect of $NH_3$ volatilization from hog manure is the effect on acid rain. The reportedly dominant source of atmospheric $NH_3$ in Europe is livestock waste, with long term trends showing a 50% increase in $NH_3$ emissions in Europe from 1950 to 1980. Ammonia raises the pH of rainwater, which allows more $SO_2$ to dissolve in it. Ammonium sulfate then forms, which oxidizes in the soil, releasing nitric and sulfuric acid. This produces two to five times the acid input to soils previously described for acid atmospheric deposition, resulting in extremely low pH values (2.8–3.5) and high levels of dissolved aluminum in non-calcareous soils. Ammonia volatilization can also contribute to eutrophication. Reports show that nitrogen deposited via wet fallout tripled in Denmark from 1955 to 1980, corresponding to increases in nitrogen losses from agricultural operations during this period. The rising levels of nitrogen in the fallout have also been linked to the $NH_3$ content in Danish streams.

Atmospheric ammonia can also result in the formation of ammonium nitrate particles in the air. These particles, which are usually less than 2 microns in size, contribute greatly to small airborne particles referred to as PM-10's (particulate matter less than 10 microns).

Swine (*Sus scrofa domesticus*) production is currently on the rise in the United States. As the swine industry moves into watersheds susceptible to eutrophication, various groups have voiced concern over water pollution. Modern swine rearing facilities often have large numbers of animals and a relatively limited land base to apply the manure. This leads to excessive application of nutrients, especially phosphorus, to the land. Phosphorus is considered to be the primary cause of eutrophication of freshwater systems. The threat of eutrophication due to phosphorus runoff has already resulted in limits being placed on the amount of animal units produced per area of land in The Netherlands.

SUMMARY OF THE INVENTION

Aluminum sulfate has previously been used to reduce phosphorus solubility and to inhibit ammonia volatilization from poultry litter, with tremendous success. U.S. Pat. No. 5,622,697 to Moore. However, when aluminum sulfate is added to a manure slurry, it can generate harmful off-gasses that compound the odor problems associated with controlled livestock operations. It has unexpectedly been discovered that aluminum chloride and aluminum nitrate, when contacted with manure slurries from livestock, reduce the harmful environmental effects of the manure, such as ammonia volatilization and phosphorus solubilization, as well as aluminum sulfate. Aluminum chloride and aluminum nitrate reduce ammonia volatilization and phosphorus solubilization without generating other harmful off-gasses.

In accordance with the purpose(s) of this invention, as embodied and broadly described herein, this invention, in one aspect, relates to a method of treating animal manure comprising contacting animal manure solids with a treatment composition comprising a treatment effective amount of $AlCl_3.nH_2O$ or $Al(NO_3)_3.mH_2O$, or the residue of $AlCl_3.nH_2O$ or $Al(NO_3)_3.mH_2O$, to form a resulting slurry, wherein n is from 0 to 10, and m is from 0 to 12.

Additional aspects and advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE INVENTION

Figure 1:
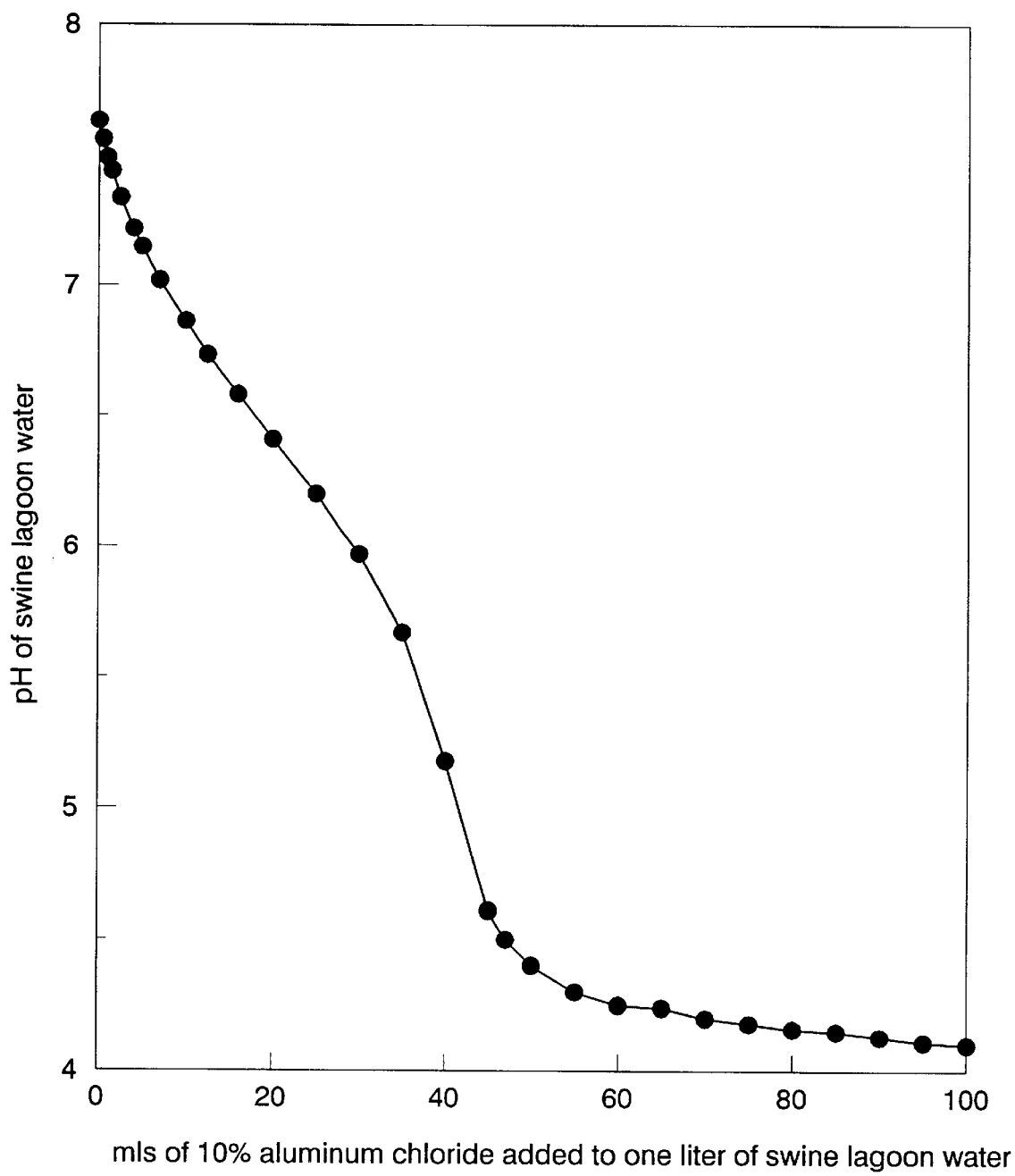
FIG. 1 is a graph showing the relationship between the pH of swine lagoon water and the amount of aluminum chloride added to the swine lagoon water.

The present invention may be understood more readily by reference to the following detailed description of the invention and the Examples included therein and to the Figure and its previous and following description. Before the present compounds, compositions and methods are disclosed and described, it is to be understood that this invention is not limited to specific methods, or to particular formulations, as such may, of course, vary. It is also to be understood that the terminology used herein is for the purpose of describing particular embodiments only and, unless the context dictates otherwise, is not intended to be limiting.

Use of Terms

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a treatment composition" includes mixtures of two or more such treatment compositions, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

Definitions

In this specification and in the claims which follow, reference will be made to a number of terms which shall be defined to have the following meanings:

Parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, an aluminum chloride hexahydrate residue in solution refers to the aluminum and chloride ions and $H_2O$ molecules that are obtained by dissolving aluminum chloride hexahydrate in solution, as well as the $Al(OH)_3$ that is also generated, regardless of whether the ions and molecules are obtained by dissolving aluminum chloride hexahydrate in solution. Thus, the solution residue of aluminum chloride hexahydrate could be obtained by dissolving anhydrous aluminum chloride in water, as long as at least six moles of water are present per mole of aluminum chloride. A "slurry residue" is the resulting product of the chemical species in a slurry.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that the description includes compositions that contain and do not contain a foaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

A manure slurry refers to a mixture of manure and urine and/or water. Thus, a manure slurry is formed when animal manure and urine are contacted, or when manure is mixed with water from an external source.

Aluminum chloride refers to hydrated or anhydrous aluminum chloride when present as a solid. Aluminum chloride can be used in this invention in solid or liquid form, and thus discussions of aluminum chloride include both solid aluminum chloride and aluminum chloride solutions (in which aluminum chloride is present as a solution residue). Preferred aluminum chloride for practicing this invention is $AlCl_3.nH_2O$, wherein n is from 0 to 10, and even more preferred aluminum chloride is $AlCl_3.nH_2O$, wherein n is from 4 to 8. Aluminum chloride hexahydrate is most preferred.

Aluminum nitrate refers to hydrated or anhydrous aluminum nitrate when present as a solid. Aluminum nitrate can be used in this invention in solid or liquid form, and thus discussions of aluminum nitrate include both solid aluminum nitrate and aluminum nitrate solutions (in which aluminum nitrate is present as a solution residue). Preferred aluminum nitrate for practicing this invention is $Al(NO_3)_3.mH_2O$, wherein m is from 0 to 12, and even more preferred aluminum nitrate is $Al(NO_3)_3.mH_2O$, wherein m is from 7 to 11. Aluminum nitrate nonahydrate is most preferred.

The alum or aluminum sulfate referred to in this specification is $Al(SO_3)_3.nH_2O$, wherein n is generally from 14 to 18.

A sample refers to a portion of a composition, of any size. Thus, a composition has a sample that has a pH below 6.5 if any portion of the composition exhibits a pH below 6.5.

A controlled animal rearing facility refers to any facility in which animals are gathered, and in which live stock manure is collected and managed.

Solids content refers to the amount of solids present in a liquid composition that remain after water from the liquid is evaporated.

Discussion

This invention relates generally to the treatment of animal wastes to reduce harmful phosphorus runoff from fields to which the animal wastes are applied, and to the reduction of ammonia emitted from such animal wastes. The invention is particularly applicable to treating slurries of animal waste that are generated during the rearing of livestock in controlled rearing facilities.

This invention, in one aspect, relates to a method of treating animal manure solids comprising contacting the solids with a treatment composition comprising a treatment effective amount of $AlCl_3.nH_2O$ or $Al(NO_3)_3.mH_2O$, or the residue of $AlCl_3.nH_2O$ or $Al(NO_3)_3.mH_2O$, to form a resulting slurry, wherein n is from 0 to 10, and m is from 0 to 12. In a preferred embodiment the treatment composition comprises a treatment effective amount of $AlCl_3.nH_2O$ or the residue of $AlCl_3\ nH_2O$, and n is from about 4 to about 8. In a more preferred embodiment the treatment composition comprises aluminum chloride hexahydrate, or the residue thereof. In a separate preferred embodiment the treatment composition comprises a treatment effective amount of $Al(NO_3)_3.mH_2O$ or the residue of $Al(NO_3)_3.mH_2O$, and m is from about 7 to about 11. In a more preferred embodiment the treatment composition comprises aluminum nitrate nonahydrate, or the residue thereof.

The methods of this invention are effective to reduce phosphorus solubility in the manure, reduce phosphorus runoff and/or phosphorus leaching from fields fertilized with manure, inhibit ammonia volatilization from the manure, improve animal performance (such as weight gain, feed conversion, and/or disease resistance of animals), flocculate the solids in the manure, reduce pathogens in the manure, increase the nitrogen content in the manure, reduce acid rain, atmospheric nitrogen loading, and PM-10s (particulate matter<10 microns), associated with the manure, and/or reduce energy use in an animal rearing facility (by reducing ventilation requirements). When aluminum chloride is contacted with manure to form a slurry, it lowers the pH of the manure, and converts ammonia to ammonium, which keeps the inorganic nitrogen from volatilizing. Thus, this process increases the fertilizer value of the manure, while inhibiting ammonia volatilization inside the animal rearing facility and to the atmosphere, for the benefit of both animals and humans alike.

The methods of this invention are effective for treating any livestock manure, and especially livestock manures that are combined in liquid slurries in controlled livestock rearing operations. Animals commonly reared in such operations include sheep, swine, poultry, goats, cattle, dairy cows, ducks, and geese. The invention is especially applicable to swine rearing and dairy cow rearing operations.

The amount of $AlCl_3.nH_2O$ or $Al(NO_3)_3.mH_2O$ (or residues thereof) that is contacted with the animal manure solids generally depends upon the amount of solids in need of treatment. The solids are from two sources: (1) fresh manure from the livestock, and (2) if water is recycled from the holding pond, the amount of manure solids present in the recycled water. $AlCl_3nH_2O$ or $Al(NO_3)_3.mH_2O$ is also from two sources: (1) fresh $AlCl_3.nH_2O$ or $Al(NO_3)_3.mH_2O$ (or residues thereof), and (2) if water is recycled from the holding pond, the amount of $AlCl_3.nH_2O$ or $Al(NO_3)_3.mH_2O$ (or residues thereof) present in the recycled water. The amount of aluminum chloride or aluminum nitrate may also depend on the phosphorus content and/or the alkalinity of the animal waste; both of which are normally related to the solids contents.

In a preferred embodiment, which is particularly effective for reducing phosphorus solubility and inhibiting ammonia volatilization, and the resulting slurry comprises from about 0.001 to about 50 parts by weight of the slurry residue of $AlCl_3.nH_2O$ or $Al(NO_3)_3.mH_2O$, and about 99.999 to about 50 parts by weight manure solids. These components of the slurry can generally be present at any ratio or range of ratios within the above endpoints. The ratio of the slurry residue of $AlCl_3.nH_2O$ or $Al(NO_3)_3.mH_2O$ to manure solids can be greater than the smallest ratio (0.001:99.999), and/or less than the greatest ratio (50:50). Thus, the weight ratio of the slurry residue of $AlCl_3nH_2O$ or $Al(NO_3)_3.mH_2O$ to manure solids can be greater than 0.001:99.999; 0.005:99.995; 0.01:99.99; 0.05:99.95; 0.1:99.9; 0.5:99.5; 1:99; 2:98; 5:95; or 10:90, and/or less than 50:50; 40:60; 30:70; 25:75; 20:80; 15:85; 10:90; 5:95; or 1:99, in any overlapping range that is mathematically possible.

The amount of $AlCl_3.nH_2O$ or $Al(NO_3)_3.mH_2O$ (or residue thereof) that is effective to reduce phosphorus solubility or to inhibit ammonia volatilization can also be expressed as grams of the slurry residue of $AlCl_3.nH_2O$ or $Al(NO_3)_3.mH_2O$ per liter of resulting slurry. The liquids in the slurry are mostly from the flush water in slanted floor systems, the pit water in pit systems, and livestock urine. Water spilled by the livestock, and water used to rinse the facility, also contributes to the slurry liquids. The flush water or pit water can be fresh water or recycled holding pond water. The effective amounts will, therefore, vary depending upon whether the treatment composition also comprises recycled holding pond water. If the treatment composition does not comprise recycled holding pond water, then the resulting slurry preferably comprises from about 0.001 to about 100, and more preferably the resulting slurry comprises from about 0.1 to about 10 grams of the slurry residue of $AlCl_3.nH_2O$ or $Al(NO_3)_3.mH_2O$ per liter of slurry. If the treatment composition does comprise recycled holding pond water, then the resulting slurry preferably comprises from about 0.001 to about 200, and more preferably the resulting slurry comprises from about 0.1 to about 20 grams of the slurry residue of $AlCl_3.nH_2O$ or $Al(NO_3)_3.mH_2O$ per liter of slurry.

In situations in which the liquid flush water or pit water is the treatment composition, the amount of $AlCl_3.nH_2O$ or $Al(NO_3)_3.mH_2O$ (or residue thereof) that is effective to reduce phosphorus solubility or to inhibit ammonia volatilization can also be expressed as grams of the composition residue of $AlCl_3.nH_2O$ or $Al(NO_3)_3.mH_2O$ per liter of composition. Again, the effective amounts will vary depending upon whether the flush water also comprises recycled holding pond water. If the treatment composition does not comprise recycled holding pond water, then the treatment composition preferably comprises from about 0.001 to about 100, and more preferably from about 0.1 to about 10 grams of the composition residue of $AlCl_3.nH_2O$ or $Al(NO_3)_3.mH_2O$ per liter of treatment composition. If the treatment composition does comprise recycled holding pond water, then the treatment composition preferably comprises from about 0.001 to about 200, and more preferably from about 0.1 to about 20, grams of the composition residue of $AlCl_3.nH_2O$ or $Al(NO_3)_3.mH_2O$ per liter of treatment composition.

The amount of $AlCl_3 \cdot nH_2O$ or $Al(NO_3)_3 \cdot mH_2O$ (or residue thereof) that is effective to inhibit ammonia volatilization can also be expressed as the amount that results in a preferred pH of the treatment composition and/or of a sample of the resulting slurry. Thus, in a preferred embodiment the resulting slurry comprises a sample that has a pH of about 7.5 or below, more preferably 7.0 or below, and even more preferably 6.5 or below. In a more preferred embodiment, the pH of the sample remains at or below the above recited pH values for at least 4 hours, and more preferably for at least 24 hours. In another embodiment the treatment composition has a pH of about 7.5 or below, more preferably 7.0 or below, and even more preferably 6.5 or below. The pH of the treatment composition can be selected based upon the level of ammonia volatilization and/or phosphorus control.

One method of obtaining a treatment composition that has a pH at or below the above-described pH values would be to add the aluminum chloride to water used to flush the houses. In this system, a large tank of liquid aluminum chloride would be prepared by adding to water a concentrated liquid aluminum chloride (preferably about 27.8 wt. % of the solution residue of anhydrous aluminum chloride) to periodically flush manure from the facility. Thus, if manure is received onto a concrete floor, the tank containing water and liquid aluminum chloride can flush the surface of the floor at any desired frequency. If manure is collected in a confined liquid pit beneath slatted floors, then the contents of the large tank could be used to refill the pit when the pit is periodically drained.

The amount of aluminum chloride needed for a tank of liquid aluminum chloride can be determined principally by the amount of liquid in the tank, and by the alkalinity of the water in the tank. To determine the amount of aluminum chloride needed per liter of water in the tank, the following procedure may be used:

Obtain 1000 ml of the water to be used for flushing. While stirring, slowly add aluminum chloride and measure the pH of the water as subsequent aluminum chloride additions are made. Note the amount of aluminum chloride needed to decrease the pH to 7.5, 7.0, 6.5, 6.0, etc. This is basically an acid-base titration, with the aluminum chloride being the acid. An example of the results from a titration of swine lagoon effluent with a 10% aluminum chloride solution is shown in FIG. 1. After this has been determined, the amount of aluminum chloride needed per flush can be calculated using the volume of water held by the flush tank, by simply multiplying the number of liters contained in the tank by the amount of aluminum chloride required to reduce the pH to the desired level. The foregoing method can also be used to determine the amount of aluminum chloride needed to achieve a desired pH in the resulting slurry, except that a 1000 ml sample of the resulting slurry without aluminum chloride would be analyzed instead.

The application system for this invention could be of two basic designs; depending on the type of rearing facility. In a facility with concrete floors, the aluminum chloride would typically be added to the flush tanks, as described above. In a house with a pit beneath slatted flooring, aluminum chloride could be added to the flush tanks or directly to the liquid pit beneath the flooring.

In some instances, especially when aluminum chloride or aluminum nitrate react with recycled holding pond effluent, it may also be beneficial to use a defoaming agent to prevent the formation of foam in the liquid to which the aluminum chloride is added. The gas from this foam production is mainly carbon dioxide, which is produced when the aluminum chloride reacts with carbonates in the manure. Many different defoamers or antifoamers will alleviate this problem. One example of a suitable defoamer would be a silicone oil in water emulsion, such as 20% silica-filled polydimethyl siloxane (chemical family=dimethyl polysiloxane emulsion). Thus, in another embodiment the methods of this invention further comprise contacting a defoaming agent or antifoaming agent with the manure. In a preferred embodiment the methods of this invention further comprise contacting a defoaming agent with the manure, wherein the defoaming agent comprises a dimethyl polysiloxane emulsion.

Experimental

The following examples are put forth so as to provide those of ordinary skill in the art with a complete disclosure and description of how the compounds claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature, and pressure is at or near atmospheric.

EXAMPLE 1

The following experiment was conducted to determine the effect of aluminum chloride and alum on phosphorus solubility from swine lagoon effluent. About 20 liters of a manure slurry from a swine rearing facility were collected and homogenized in a blender. The manure slurry contained manure, urine, and flush water. The flush water was recycled holding pond effluent removed at the center of the water column in the holding pond, combined with the aluminum chloride or alum treatment. The holding pond water had never before been treated with aluminum chloride or any other phosphorus control agent. Soluble phosphhorus reductions from the aluminum chloride and alum treatments were determined by APHA (American Public Health Association) method 424-G.

One hundred ml of the slurry were added to 45 250-ml polycarbonate centrifuge tubes. There were 8 alum treatments and 8 aluminum chloride treatments with 3 replications per treatment. The treatments were 0, 0.1, 0.25 0.5, 1.0, 2.0, 5.0 and 10 ml of 10% alum and aluminum chloride (10 wt. % solution of each). After adding the treatments, the tubes were put on a shaker and shaken for 5 minutes, then pH was measured. The samples were then incubated in the dark at 25° C. for three days. At this time the tubes were centrifuged at 9,000 rpm for 30 minutes and the supernatant was filtered through 0.45 um filters. The samples were then acidified to pH 2.0 with HCl and frozen until analyzed. Soluble reactive phosphorus (SRP) was determined using the Murphy-Riley method on a Technicon Auto-analyzer. Soluble metals were analyzed using ICAP. Unfiltered samples were analyzed for pH, EC and alkalinity.

Figure 2A:
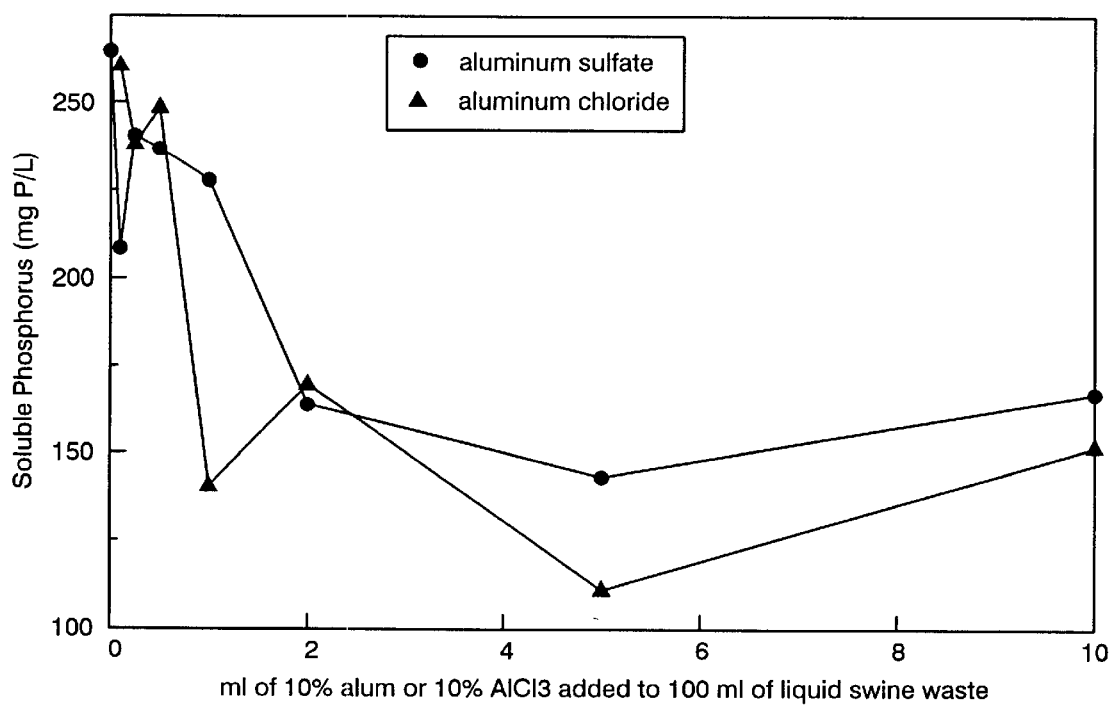
FIGS. 2A and 2B are graphs showing the effect of varying concentrations of alum and aluminum chloride on (A) soluble reactive phosphorus, and (B) pH, of liquid swine manure.
Figure 2B:
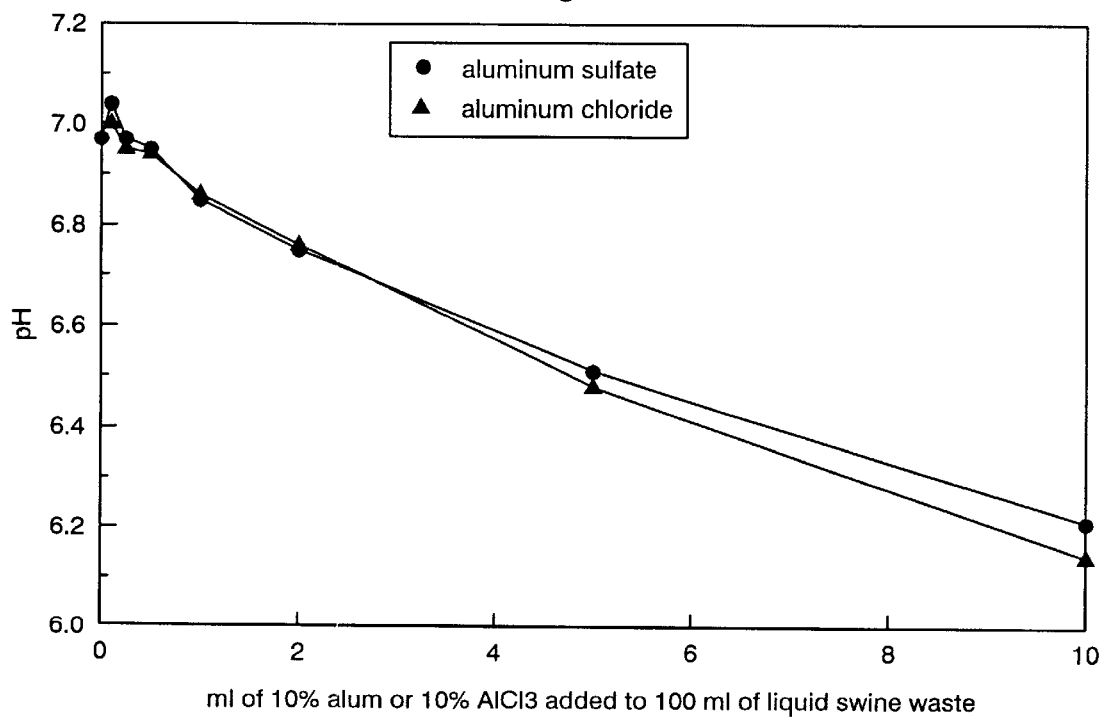

The results of this experiment are shown in FIG. 2. Aluminum chloride decreased the amount of soluble phosphorus, as did aluminum sulfate. However, the aluminum chloride did not result in hydrogen sulfide gas formation. Both chemicals also reduced the pH, which would inhibit ammonia volatilization.

EXAMPLE 2

Although the experiment described above resulted in good reductions in soluble phosphorus, the manure used was not fresh and had been sitting in the laboratory for several weeks prior to the experiment. This may have affected the results, so another study was conducted with liquid swine waste. A manure slurry was collected as described above and returned to the laboratory where is was homogenized in a blender. One hundred ml of the slurry were added to 9 250-ml polycarbonate centrifuge tubes. There were three treatments; a control, 10 ml of 10% alum and 10 ml of 10% aluminum chloride. After adding these, the tubes were put on a shaker and shaken for 5 minutes, then pH was measured. The samples were then incubated in the dark at 25° C. for three days. At this time the tubes were centrifuged at 9,000 rpm for 30 minutes and the supernatant was filtered through 0.45 um filters. The samples were then acidified to pH 2.0 with HCl and frozen until analyzed. Soluble reactive phosphorus (SRP) was determined using the Murphy-Riley method on a Technicon Auto-analyzer. Soluble metals were analyzed using ICAP. Unfiltered samples were analyzed for pH, EC and alkalinity.

Figure 3A:
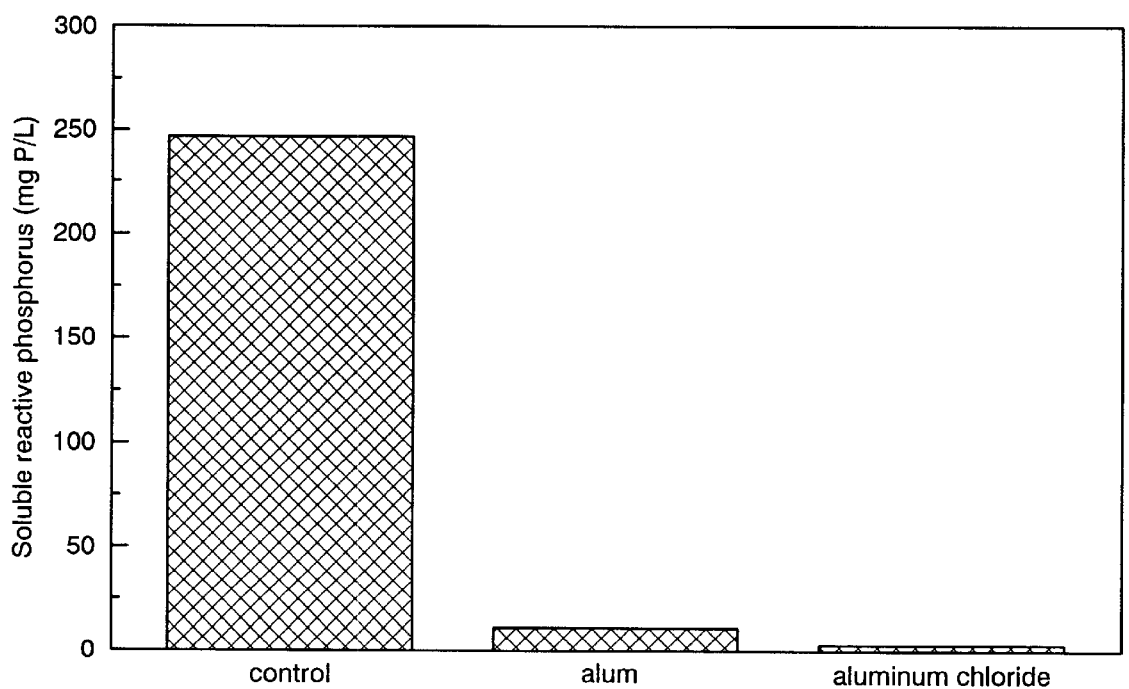
FIGS. 3A and 3B are bar graphs showing (A) soluble reactive phosphorus, and (B) pH, of 100 ml. of liquid swine manure to which has been added 10 ml. of 10% alum or aluminum chloride.
Figure 3B:
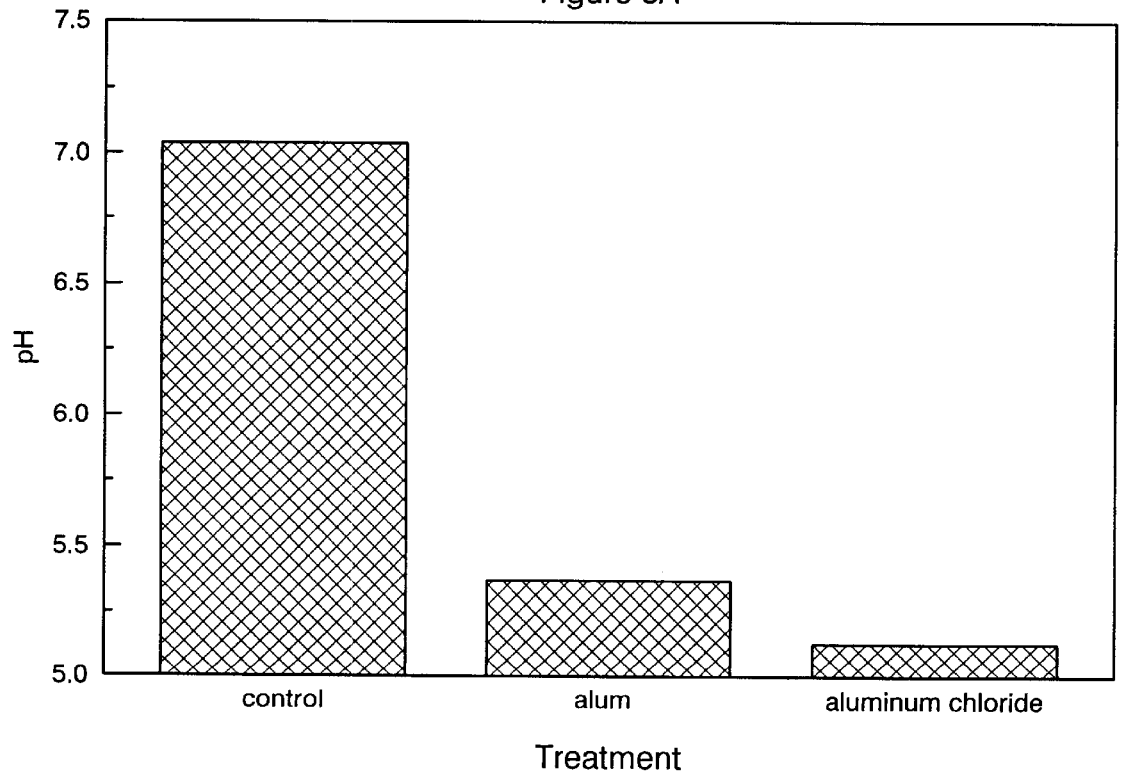

Both aluminum chloride and aluminum sulfate additions greatly reduced soluble phosphorus levels and pH, with the lowest soluble phosphorus levels and pH observed with aluminum chloride (FIG. 3). Aluminum chloride additions resulted in a decrease in soluble phosphorus of about 100 fold.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of treating animal manure in a first liquid slurry on a surface comprising contacting the slurry with a treatment effective amount consisting essentially of $AlCl_3 \cdot nH_2O$ or $Al(NO_3)_3 \cdot mH_2O$, to form a resulting slurry, wherein n is from about 4 to 8, and m is from 0 to 12.

2. The method of claim 1 wherein $AlCl_3 \cdot nH_2O$ or $Al(NO_3)_3 \cdot mH_2O$ is added in sufficient quantities to provide a foam layer.

3. The method of claim 1 wherein the manure is from sheep, swine, poultry, goats, cattle, dairy cows, ducks, or geese.

4. The method of claim 1 wherein the resulting slurry comprises from about 0.001 to about 50 parts by weight of the solution of the $AlCl_3 \cdot nH_2O$ or $Al(NO_3)_3 \cdot mH_2O$.

5. The method of claim 1 wherein the resulting slurry comprises from about 0.1 to about 20 parts by weight of the solution of $AlCl_3 \cdot nH_2O$ or $Al(NO_3)_3 \cdot mH_2O$.

6. The method of claim 1 wherein the resulting slurry comprises from about 0.001 to about 200 grams of the solution of $AlCl_3 \cdot nH_2O$ or $Al(NO_3)_3 \cdot mH_2O$ per liter of slurry.

7. The method of claim 1 wherein the resulting slurry comprises from about 0.1 to about 20 grams of the solution of $AlCl_3 \cdot nH_2O$ or $Al(NO_3)_3 \cdot mH_2O$ per liter of slurry.

8. The method of claim 1 wherein the surface is a solid surface, and manure is contacted with the treatment composition by flushing the surface with the treatment composition.

9. The method of claim 1 wherein the treatment composition comprises a treatment effective amount of $Al(NO_3)_3 \cdot mH_2O$ and m is from about 7 to 11.

10. The method of claim 1 wherein the treatment composition comprises aluminum chloride hexahydrate, or the residue thereof.

11. The method of claim 1 wherein the treatment composition comprises aluminum nitrate nonahydrate, or the residue thereof.

12. The method of claim 1 wherein the treatment composition is a granular solid.

13. The method of claim 1 wherein the treatment composition is a liquid comprising from about 0.001 to about 200 grams of the solution of $AlCl_3 nH_2O$ or $Al(NO_3)_3 \cdot mH_2O$ per liter of liquid.

14. The method of claim 1 wherein the treatment composition is a liquid comprising from about 0.1 to about 20 grams of the solution of $AlCl_3 \cdot nH_2O$ or $Al(NO_3)_3 \cdot mH_2O$ per liter of liquid.

15. A method of treating animal manure generated by livestock reared in a controlled rearing facility, wherein the facility comprises a surface to receive manure from the livestock, comprising contacting the manure with a treatment composition consisting essentially of a treatment effective amount of $AlCl_3 \cdot nH_2O$ or $Al(NO_3)_3 \cdot mH_2O$, to form a resulting slurry, wherein n is from about 4 to 8, and m is from 0 to 12.

16. The method of claim 1 wherein the resultant slurry comprises a sample that has a pH of about 7.5 or below.

17. The method of claim 1 wherein the resultant slurry comprises a sample that has a pH of about 6.5 or below.

18. The method of claim 1 wherein in the first liquid slurry, the level of soluble phosphorus in the resultant slurry is less than the level of soluble phosphorus in the first liquid slurry.

19. The method of claim 1 further comprising contacting a defoaming agent or antifoaming agent with the manure.

20. The method of claim 1 further comprising contacting a defoaming agent or antifoaming agent with the manure, wherein the defoaming agent or antifoaming agent comprises a silica-filled polydimethyl siloxane.

21. The method of claim 15 wherein the surface is a surface of water that is confined in a pit, and wherein the water comprises the treatment composition.

22. The method of claim 15 wherein the livestock comprises sheep, swine, poultry, goats, cattle, dairy cows, ducks, or geese.

* * * * *